(12) United States Patent
Jansen et al.

(10) Patent No.: US 8,312,191 B2
(45) Date of Patent: Nov. 13, 2012

(54) ELECTRONIC MODULE AND A PROCESS FOR OPERATING A SYSTEM MODULE

(75) Inventors: Andreas Jansen, Murnau (DE); Tan Ban Huat, Singapore (SG)

(73) Assignee: Infineon Technologies AG, Munich (DE)

( * ) Notice: Subject to any disclaimer, the term of this patent is extended or adjusted under 35 U.S.C. 154(b) by 1535 days.

(21) Appl. No.: 11/288,406

(22) Filed: Nov. 29, 2005

(65) Prior Publication Data
US 2006/0230262 A1    Oct. 12, 2006

(30) Foreign Application Priority Data

Nov. 30, 2004 (DE) .......................... 10 2004 057 787

(51) Int. Cl.
*G06F 13/42* (2006.01)
*G06F 3/00* (2006.01)
(52) U.S. Cl. .......................................... 710/105; 710/14
(58) Field of Classification Search ................ 710/8, 10, 710/14, 104, 105, 305; 340/825.57, 825.63
See application file for complete search history.

(56) References Cited

U.S. PATENT DOCUMENTS

| | | | | |
|---|---|---|---|---|
| 4,967,394 A | * | 10/1990 | Minagawa et al. | 365/185.23 |
| 5,434,861 A | * | 7/1995 | Pritty et al. | 370/449 |
| 5,473,572 A | * | 12/1995 | Margeson, III | 365/227 |

FOREIGN PATENT DOCUMENTS

| | | |
|---|---|---|
| DE | 100 14 581 A1 | 9/2001 |
| DE | 10306102 A1 | 9/2004 |
| JP | 2005142662 A * | 6/2005 |

OTHER PUBLICATIONS

'Flash Erasable Programmable Read-Only Memory'. The Free-Online Dictionary of Computing. Online Apr. 22, 1995. Retrieved from Internet Aug. 23, 2007. <http://foldoc.org/index.cgi?Flash+ROM>.*
'Protocol'.The Free-Online Dictionary of Computing. Online Jan. 12, 1995. Retrieved from Internet Aug. 23, 2007. <http://foldoc.org/index.cgi?protocol>.*
'Out-of-band signaling'. "Telecom Glossary 2K". ATIS Committee T1A1. Online Feb. 28, 2001. Retrieved from Internet Aug. 24, 2007. <http://www.atis.org/tg2k/_out-of-band+signaling.html>.*
Stone, Jonathan, et al. "Performance of Checksums and CRCs over Real Data". IEEE/ACM Transactions on Networking. vol. 6, No. 5. Oct. 1998. pp. 529-543.*

* cited by examiner

*Primary Examiner* — Thomas J Cleary
(74) *Attorney, Agent, or Firm* — Slater & Matsil, L.L.P.

(57) ABSTRACT

The invention relates to an electronic module, in particular a micro-processor and/or micro-controller module, and a process for operating a system module, able to be connected with a bus, in particular a LIN bus system. The process includes operating the system module in a first operating mode, and operating the system module in a second operating mode, when, within a pre-determined time period after the start of the first operating mode, a mode start and/or mode change signal—not provided for by the system protocol—is received via the bus system.

16 Claims, 3 Drawing Sheets

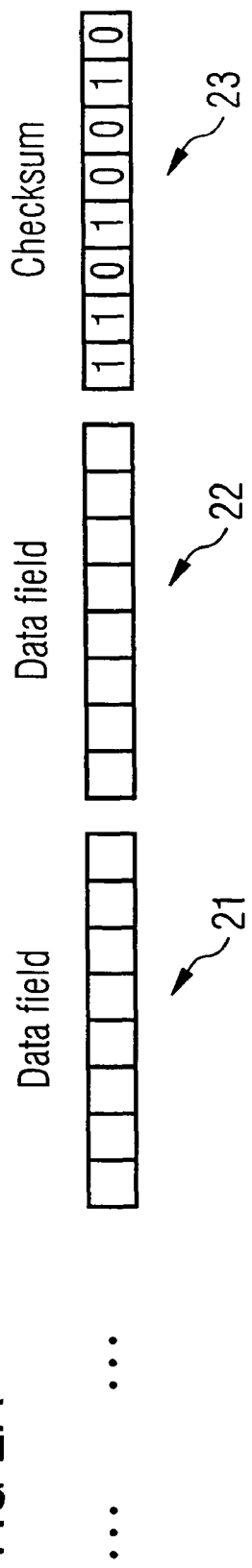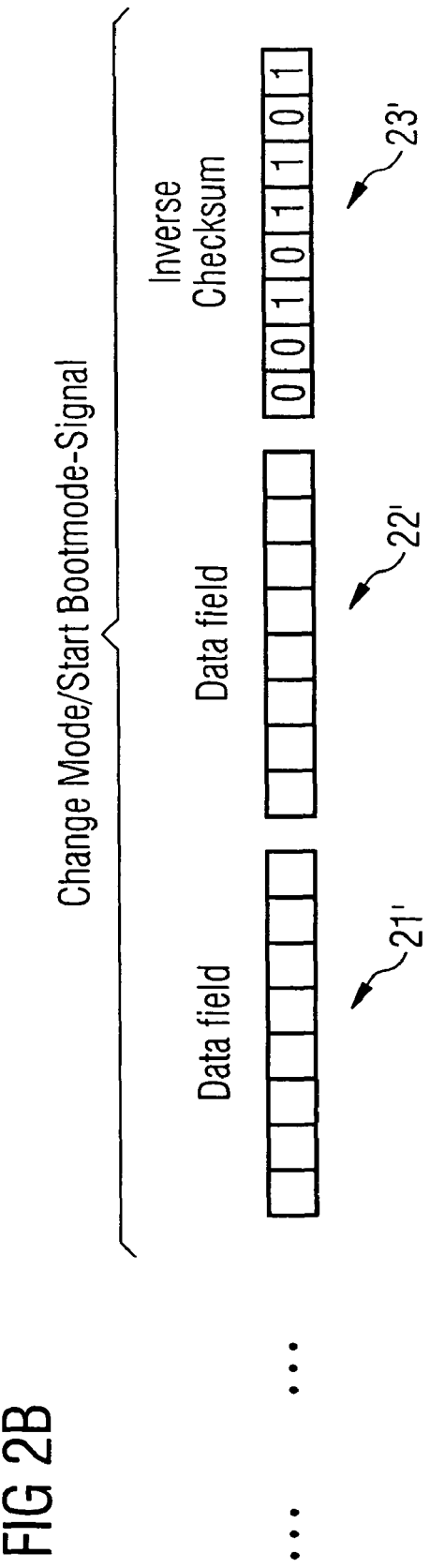

ELECTRONIC MODULE AND A PROCESS FOR OPERATING A SYSTEM MODULE

CLAIM FOR PRIORITY

This application claims the benefit of priority to German Application No. 10 2004 057 787.0, filed Nov. 30, 2004.

TECHNICAL FIELD OF THE INVENTION

The invention relates to a process for operating a system module able to be connected with a bus system, and to an electronic module, in particular a micro-processor and/or a micro-controller module, for instance an electronic module able to be connected with a bus system, in particular a LIN bus system.

BACKGROUND OF THE INVENTION

In electrical or electronic systems, individual system modules, for instance various electronic assemblies, various electronic components, in each case arranged on an individual assembly (for instance various semi-conductor components arranged on an individual assembly), various sub-components provided in one and the same component (in particular various elements of a semi-conductor component, for instance of a memory and/or computing circuit, for instance of a micro-controller or micro-processor, etc.) etc., communicate via a transfer medium—for example a bus system—consisting of one or more transfer lines.

Bus systems can be used jointly by several, in particular by two or more than two modules/components/elements.

Many conventional bus systems consist of several partial systems, for example a data bus—consisting of one or more data lines—for the transmission of actual useful data, and/or of an address bus—consisting of one or more address lines—for the transmission of address data, and/or a control bus—consisting of one or more control lines—for the transmission of control data, etc.

In comparison to this, a so-called LIN bus system is of a substantially simpler construction (LIN=Local Interconnect Network). A LIN bus system consists in general only of one single transmission line, with a plurality of various assemblies/components/elements able to be connected with it. Consequently both useful data and address and/or control data need to be transmitted via the LIN bus transmission line.

The assemblies/components/elements connected with a LIN bus system usually contain just three inputs; one input for the LIN bus transmission line and two supply voltage inputs.

In terms of the LIN bus protocol any required combination of data length and content is allowed in principle; no pre-defined control words are specified by the protocol. Instead corresponding control words must be—individually—determined for each application.

LIN bus systems can be operated at data rates of for instance up to 20 Kbit/s; these systems are based on master/slave architecture with a single master and one or more slaves.

As a result of the relatively simple and cost-effective construction of LIN bus systems, they are often employed for the control of divided electrical systems in non-critical environments in terms of chronology and/or security, for instance for controlling automotive applications that are non-critical in terms of chronology and/or security.

Possible applications are for instance the micro-controller and/or micro-processor based control of DC and stepping motors for electrical window-winders and wing mirrors, the adjustment of headlight dip switches and the management of sensor information for the control of air-conditioners or seat positions etc., etc.

Conventional micro-controller and/or micro-processor systems contain one or more central control and/or computing units (Central Processing Units (CPUs), and/or CPU "cores"), which are connected with one or more memory devices, for instance with a program and a data storage device ("program memory", and "data memory").

The memory devices can be provided on one and the same chip as the corresponding micro-controller and/or micro-processor (a so-called "embedded" micro-controller and/or micro-processor system), or alternatively also separately to them.

The "program memory" in particular contains the sequence of commands to be processed by CPU core(s), i.e. the program (and in addition where appropriate data constants to be used by the CPU core(s)).

In the "data memory" for instance the variables—in particular those that may need to be modified during the processing of the program by the CPU core(s)—can be stored.

In order to load a program into the program memory of a micro-controller and/or micro-processor system, and/or to modify a program stored there, the corresponding micro-controller and/or micro-processor system can be brought from a normal operating mode into a programming mode, for instance by applying an appropriate signal to a pre-determined system pin.

In many applications—in particular for instance in LIN bus micro-controller and/or micro-processor systems—after the micro-controller and/or micro-processor system has been installed, and/or the micro-controller and/or micro-processor system has been connected with a corresponding bus system, the above pin is no longer accessible from the outside With conventional LIN bus micro-processor systems therefore—while the above pin is still accessible—a basic program must first be loaded into the program memory; only then can the micro-processor system be installed and/or connected with the LIN bus system.

By transferring a special control word—"known" to the basic program (application-specific, and if required differing in each case)—via the LIN bus transmission line, the corresponding micro-processor can be brought from a normal operating mode into a programming mode; only then can the actual and/or client-specific program be transferred via the LIN bus transmission line to the micro-processor and stored in the above program memory.

What is a disadvantage however is inter alia, that the basic program must be loaded into the program memory before the micro-processor system is connected with the LIN bus system, so that the micro-processor can recognize a data sequence transferred via the LIN bus transmission line as the control word for the change-over into the programming mode.

SUMMARY OF THE INVENTION

The invention discloses a process available for operating a system module able to be connected with a bus system, in particular a LIN bus system, as well as a novel electronic module, in particular a micro-processor and/or micro-controller module.

The invention also relates to a process for operating a system module able to be connected with a bus system, in particular a LIN bus system. In addition, the invention relates to an electronic module, in particular a micro-processor and/ or a micro-controller module, for instance an electronic module able to be connected with a bus system, in particular a LIN bus system.

In one embodiment of the invention, there is a process for operating a system module able to be connected with a bus, in particular a LIN bus system, including:

Operating the system module in a first operating mode; and
Operating the system module in a second operating mode, when, within a pre-determined time period (t1) after the start of the first operating mode, a mode start and/or mode change signal—not provided for by the bus system protocol—is received via the bus system.

In a preferred embodiment of the invention the process includes:

Operating the system module in a third operating mode, when, within the pre-determined time period (t1) after the start of the first operating mode, no mode start and/or mode change signal is received via the bus system.

Preferably, the third operating mode is to be a normal operating mode.

It is also preferable that the second operating mode is a programming operating mode, and the first operating mode a pre-programming operating mode.

In another embodiment of the invention, there is an electronic module, in particular a micro-processor and/or micro-controller module is made available, which is able to be connected with a bus, in particular a LIN bus system, and which includes a device for detecting whether, within a pre-determined time period (t1) after the start of a first module operating mode, a mode start and/or mode change signal is received via the bus system, in particular a mode start and/or mode change signal not provided for by the bus system protocol.

It is advantageous for the device to be constructed and arranged such that when, within the pre-determined time period (t1) after the start of the first module operating mode, a mode start and/or mode change signal is received via the bus system, a change into a second module operating mode is caused, and that when no mode start and/or mode change signal is received via the bus system within the pre-determined time period (t1) after the start of the first module operating mode, a change into a third module operating mode is caused.

BRIEF DESCRIPTION OF THE DRAWINGS

The invention is described in more detail below with reference to exemplary embodiments and drawings, in which:

FIG. 2a shows an exemplary representation of data and/or data signals as transmitted by state of the art technology via the LIN bus system shown in FIG. 1.

FIG. 2b shows a representation in an embodiment example of the invention of data and/or data signals transmitted as a mode start and/or mode change command via the LIN bus system shown in FIG. 1.

DETAILED DESCRIPTION OF THE INVENTION

Figure 1:
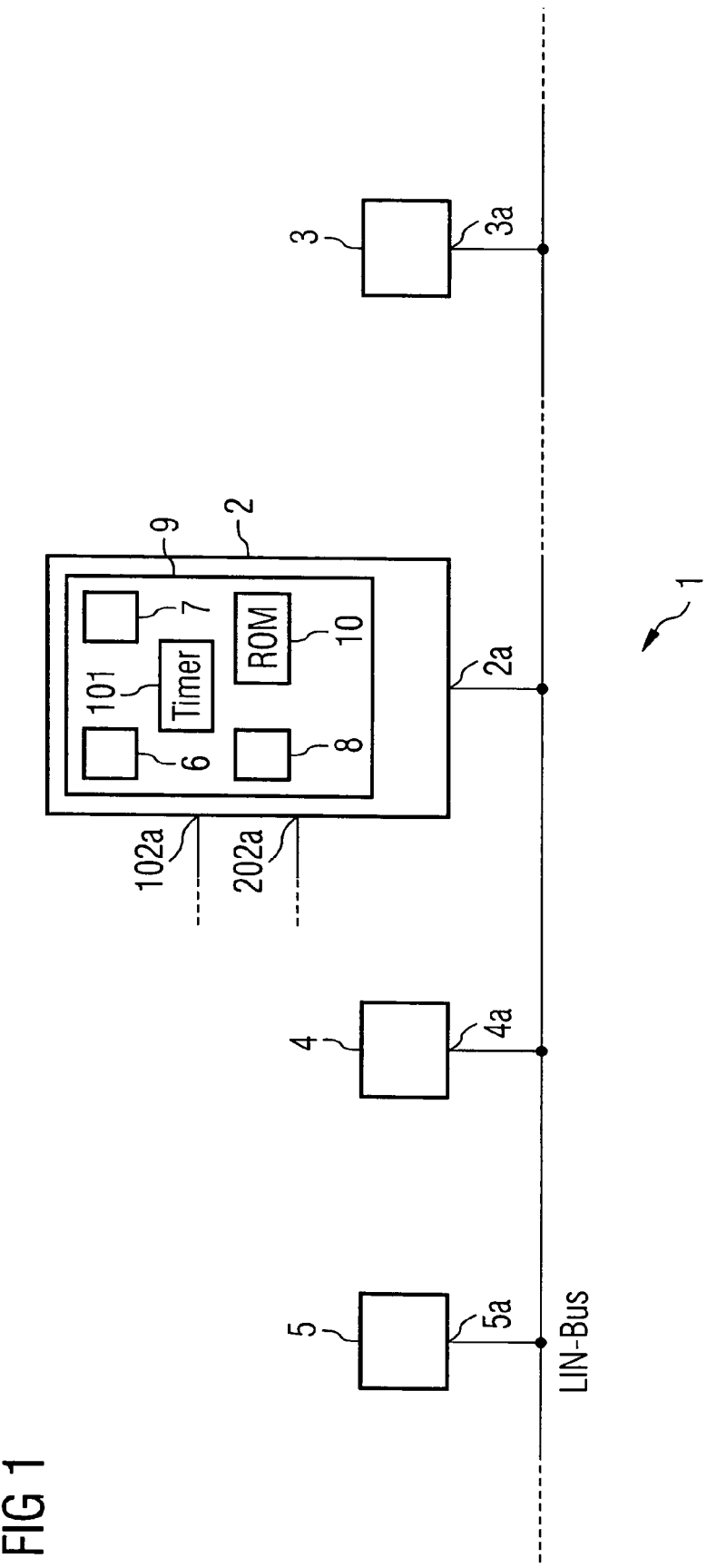
FIG. 1 shows an exemplary section of a LIN bus system, and system modules communicating with one another connected with it.

In FIG. 1, as an example, a schematic representation of a section of a bus system 1 and system modules 2, 3, 4, 5, connected with it and communicating with one another via the bus system in terms of an embodiment example of the invention is shown.

The bus system 1 can in principle involve any suitable bus system 1, by means of which the system modules 2, 3, 4, 5—for instance various electronic assemblies, various, electronic components in each case arranged on an individual assembly (for instance various semi-conductor components arranged on an individual assembly), various sub-components provided in one and the same component (in particular various elements of a semi-conductor component, for instance a memory and/or computing circuit, for instance a micro-controller or micro-processor, etc.), etc.—can communicate with one another.

It is particularly advantageous when a LIN bus system (LIN=Local Interconnect Network) can be used as the bus system 1.

The bus system 1 can include a data bus—including one or more data lines—for the transmission of the actual useful data, and/or an address bus—including one or more address lines—for the transmission of address data, and/or a control bus—including one or more control lines—for the transmission of control data, etc., especially advantageously—for instance, when a LIN bus system is used as a bus system, and as shown in FIG. 1—simply one single transmission line 1a, to which a plurality of various assemblies/components/elements can be connected as the system modules 2, 3, 4, 5.

If the bus system 1—as is the case with the LIN bus system 1 shown in FIG. 1—including a single transmission line 1a, useful as well as address and/or control data need to be transferred via this line.

The system modules 2, 3, 4, 5 connected with the LIN bus system 1 can for instance include three inputs, for instance in each case an input 2a, 3a, 4a, 5a for the LIN bus transmission line 1a, and two voltage supply inputs 102a, 202a (which can for instance be connected with a supply voltage line, and an earth line).

The LIN bus system 1 can—in accordance with the LIN bus specification—be operated for instance with data rates of for instance up to 20 Kbit/s, etc.

The LIN bus system 1 is based on master/slave architecture, more accurately: on single-master/slave architecture, whereby in each case a single system module of those connected with the LIN bus system 1 (for instance the system module 5, or the system module 2 (or any other appropriate system module)) functions as the master, and the remaining system modules connected with the LIN bus system 1 as the slave.

The bus system 1 shown in FIG. 1, and the system modules 2 connected with it, 3, 4, 5 can be advantageously employed for controlling divided electrical systems in environments that are non-critical in terms of chronology and/or security, for instance for the control of automotive applications (for instance for the control of DC and/or stepping motors for electrical window winders and wing mirrors, headlight dip switches, the management of sensor information for the control of air-conditioners and/or seating position, etc., etc.) that are non-critical in terms of chronology and/or security.

For instance one or more of the system modules 2, 3, 4, 5 connected with the LIN bus system 1 shown in FIG. 1 can be corresponding mechatronic motor systems, in which, in a corresponding motor housing—in addition to one or more motors—corresponding electronic components have been housed, for instance corresponding LIN bus transceivers, and/or corresponding voltage regulation devices, and/or corresponding actuator control devices, and/or corresponding sensor interfaces, and/or corresponding memory devices, and/or corresponding micro-controller and/or micro-processor systems, etc., etc.

For instance the system module 2 shown in FIG. 1 (and/or the system module 3, and/or the system module 4, etc.) includes, where applicable—in addition to a LIN bus transceiver, and/or a voltage regulation device, etc., etc.—a micro-controller and/or micro-processor system 9 with one or more (central) control and/or computing units 8 (central processing unit 8 (CPU), and/or CPU "core"), which are connected with one or more memory devices, for instance with a program memory device 7 and a data storage device 6.

The program and the data storage device 6, 7 can, in the present embodiment example, for instance be provided on one and the same chip as the corresponding micro-controller and/or micro-processor (and/or the CPU 8) (the so-called "embedded" micro-controller and/or micro-processor system), or alternatively also separately to it.

The program memory device 7 in particular includes the sequence of the commands to be processed by the CPU(s) 8, i.e. the program (and, where applicable, additional corresponding data constants to be used by the CPU(s) 8) (that is, so-called program data).

In contrast to this, variables—in particular those needing to be modified where applicable by the CPU(s) 8 during the running of the program—(and/or corresponding application data) can for instance be stored in the data storage device 6.

The data storage device 6 can for instance be created from one or more RAMs (RAM=Random Access Memory and/or Read-Write memory), in particular for instance DRAMs (DRAM=Dynamic Random Access Memory), or SRAMs (SRAM=Static Random Access Memory).

An appropriate non-volatile memory component, for instance and a EPROM (Erasable PROM and/or erasable fixed-value memory) or EEPROM (Electrically Erasable PROM and/or electrically erasable fixed-value memory), in particular for instance a Flash EEPROM, can be used for the program memory device 7.

Alternatively for instance a RAM can also be used as a program memory device 7, in particular for instance a DRAM.

In conventional LIN bus micro-processor systems—before connecting a corresponding system module (for instance the system module 2) with the LIN bus system 1, and/or before installing the above electronic components of a corresponding system module (for instance the system module 2) in a corresponding housing, in particular a motor housing—a base program first needs to be loaded into the program memory device of a corresponding micro-controller system (for instance into the program memory device 7 of the micro-controller system 9).

The reason for this is that the pin—provided on the micro-controller system in order to cause a change from the normal operating mode into the program mode—cannot be accessed from the outside any longer after being installed into the above housing and/or after being connected with the LIN bus system.

In contrast to this—as is more closely described below—in the present embodiment example, the micro-processor system 9 and/or the system module 2 (and/or one or more further system modules 3, 4, 5) can for instance be connected with the LIN bus system 1, and/or the above electronic components of for instance the system module 2 can be installed in a corresponding housing, in particular a motor housing, without a program, in particular without a base program (and as an alternative also with the program, in particular the base program, loaded into the memory device 7 if needed) having been loaded into the program memory device 7 of the corresponding micro-controller system 9.

In order to load a program, in particular a base program, via the LIN bus system 1 into the program memory device 7 of the micro-processor system 9, and/or to modify a program, in particular a base program stored there, etc—after the micro-processor system 9 and/or the system module 2 has been connected with the LIN bus system 1, and/or after the above electronic component, for instance the system module 2, has been installed in a corresponding housing, in particular a motor housing—the micro-processor system 9 and/or the system module 2 is brought—by using the special method more closely described below—from a working and/or a normal operating mode or a pre-program mode into a programming mode:

A device, in particular for instance the above voltage regulation device provided on the system module 2, checks to see whether an appropriate supply voltage is present at the voltage supply inputs 102a, 202a (in particular at the voltage supply input 102a connected with the above supply voltage line), or not. For this purpose for instance checks can be done to see if the voltage present at the voltage supply inputs 102a, 202a (in particular the voltage present at the voltage supply input 102a) exceeds a pre-determined critical value.

If this is the case, a time-measuring device 101 ("timer") provided on the system module 2 can be activated, and an internal reset signal (RESET) of the system module 2 deactivated, and an internal system module signal generator activated (so that the time t that has elapsed after a supply voltage present at the voltage supply input 102a is determined, and/or that has elapsed since the deactivation of the RESET signal, is measured by the timer device 101 (for instance by determining the number of pulses occurring since then)) ("pre-programming mode").

Especially when no program, in particular a base program, has been stored in the program memory device 7 of the micro-controller system 9 and/or of the system module 2 yet, it is determined—under the control of a program permanently stored in the start ROM 10 of the micro-controller system 9 and/or of the system module 2—(or alternatively—if available—under the control of a program stored in the memory device 7 of the micro-controller system 9 and/or of the system module 2, in particular a base program, or—in each case and independently of this—by the program stored in the start ROM) whether—within a first time period $t_1$ after the presence of a supply voltage has been determined at the voltage supply input 102a, and/or after the deactivation of the RESET signal (that is, while the following applies: $t<t_1$)—a special normal operating program/programming mode change command ("Change Mode" signal), and/or programming mode start command ("Start Boot Mode" signal) is relayed to the LIN bus input 2a via the LIN bus system 1.

Figure 3:
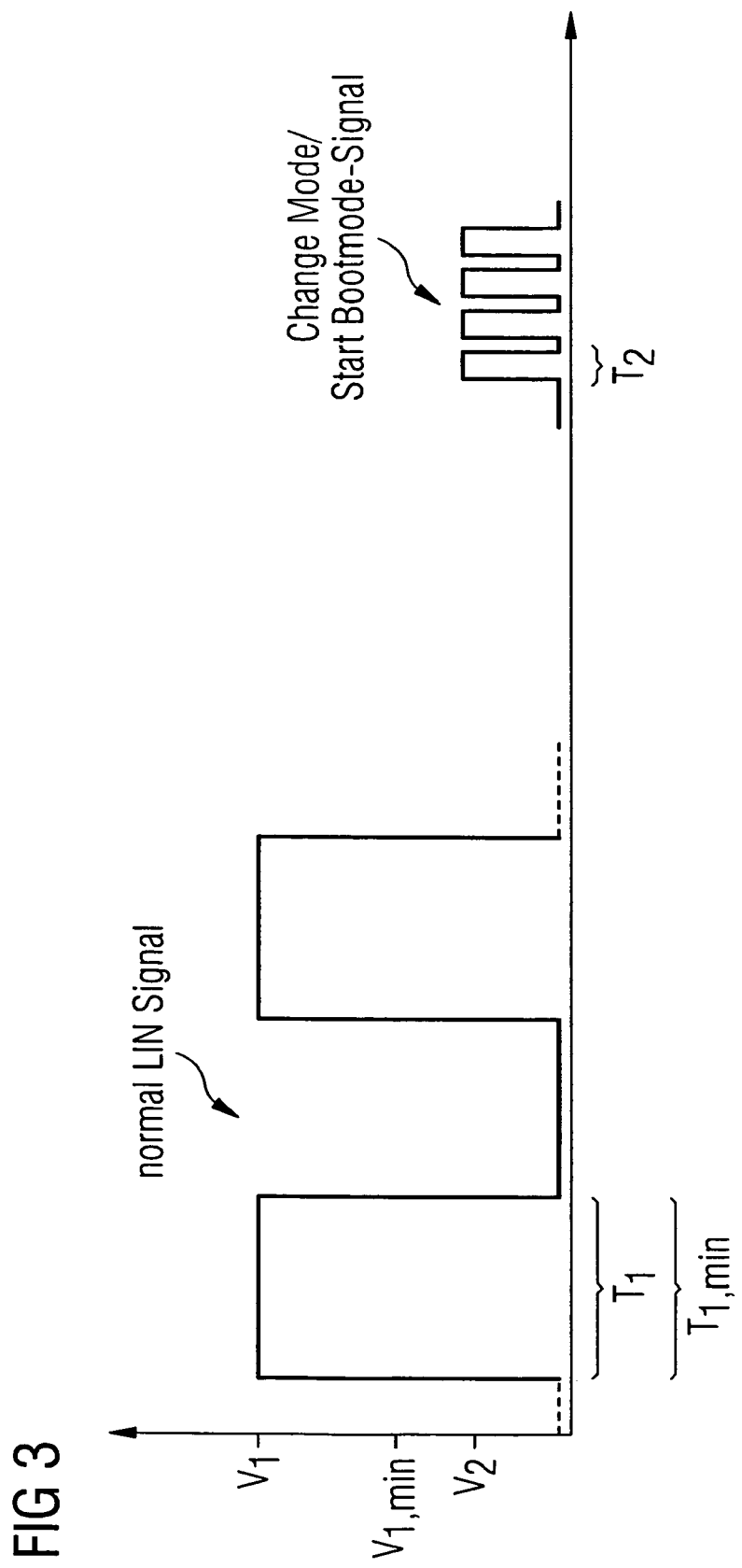
FIG. 3 shows exemplary data signals transmitted as a mode start and/or mode change command via the LIN bus system shown in FIG. 1 in a further embodiment example of the invention.

A signal, for instance one falling outside the LIN bus protocol (and/or one not admitted and/or provided for in terms of the LIN bus protocol) can be used as a normal operating/programming operating mode change command ("Change Mode" signal), and/or as programming mode start command ("Start Boot Mode" signal), for instance—as illustrated in FIG. 3—a signal (and/or an impulse sequence), which contains a lower "high logic" voltage level V2 than the "high logic" voltage level V1 as provided for in terms of the LIN bus protocol for LIN bus signals (in particular a "high logic" voltage level V2, lying below the minimum voltage level V1 as defined by the LIN bus protocol for "high logic" signals); and/or a signal of a shorter impulse duration T2, than the impulse duration T1 provided for in terms of the LIN bus protocol for LIN bus signals (in particular one with an impulse duration T2, which is shorter than the minimum impulse duration T1,min defined in terms of the LIN bus protocol), and/or a signal created by any method other than that defined in the LIN bus protocol, etc., etc.

For instance signals and/or impulse sequences can be used—as normal operation/programming operation mode change command ("Change Mode" signal), and/or programming operation mode start command ("Start Boot Mode" signal)—which, instead of showing a minimum "high logic" voltage level V1,min of at least for instance 6V, show a "high logic" voltage level V2 of for instance at least 5V lying 5%-20% below it, and/or signals/impulse sequences, which are not transferred with a maximum LIN bus data rate of for instance 20 kbit/s (i.e. that show a corresponding minimum impulse duration T1min), but rather with a data rate lying at least for instance 20%-100% above that (i.e. signals/impulse sequences, which show impulse durations lying correspondingly below the minimum impulse duration T1min)), etc.

Particularly advantageously, as an alternative (or in addition) to the signals deviating from the LIN bus protocol in the above fashion, signals more closely described in relation to FIG. 2b can be used as a normal operation/programming operation mode change command and/or programming operation mode start command.

When—controlled by the program stored on the start ROM 10 (and/or alternatively: on the program memory device 7)—it is determined that—within the above time period t1 (which can for instance be longer than 1 ms, and for instance shorter than 50 ms, in particular shorter than 20 ms)—a normal operation/programming operation mode change command ("Change Mode" signal), and/or programming operation mode start command ("Start Boot Mode" signal) has been transferred via the LIN bus system 1, the system module 2, in particular the micro-controller system 9 is brought from the normal operating mode and/or pre-programming mode into the programming mode, in particular from a "pre-boot mode"—for the first time—into a programming mode, in particular into a "boot" mode and/or "bootstrap loader" mode.

After the normal operation/programming operation mode change command ("Change Mode" signal), and/or the programming operation mode start command ("Start Boot Mode" signal) (in particular with the use of a corresponding handshake process from a computer, in particular a PC, connected with the LIN bus system 1), data transferred to the system module 2 from the system module 2, in particular from the micro-controller system 9, is not regarded as ordinary useful and/or application data, but rather as programming data.

The data transferred via the LIN bus system 1 and intended for the system module 2, can then conform with LIN bus specification data; another meaning can at any rate then be allocated to this data than to the corresponding data in the LIN bus protocol and/or in the normal operating mode.

The (programming) data transferred in the above fashion in the program mode via the LIN bus system 1 and intended for the system module 2, can be stored in the program memory device 7 of the system module 2 and/or the micro-controller system 9 (if applicable, after previously being buffered in the data storage device 6), i.e. for instance used for the purpose, after the installation and/or connection of the system module 2 and/or the micro-controller system 9 with the LIN bus system 1, of (initially) loading a base program into the program memory device 7 of the system module 2 and/or of the micro-controller system 9, and/or to modify a base program present there, and/or to load the actual and/or client-specific program into the program memory device 7 of the system module 2 and/or of the micro-controller system 9, and/or to modify a corresponding client-specific program accordingly, etc.

Advantageously, corresponding data conforming with LIN bus specifications is emitted to the system module 2, in order to bring the micro-controller system 9 (back) from the programming mode into the normal operating mode, whereby this data in the programming mode (not however in the normal operating mode) has a programming operation/normal operation mode (back) change command ("Change Mode Back" signal) meaning allocated to it.

If the system module 2—in contrast to that which was previously discussed as an example—within the above predetermined time period t1 after detecting that a supply voltage is present at the voltage supply input 102a, and/or after the deactivation of the RESET signals, does not detect any special normal operation/programming operation mode change command ("Change Mode" signal), and/or programming operation mode start command ("Start Boot Mode" signal) present at the LIN bus input 1a, the system module 2 is automatically brought into the normal operation mode.

The data transferred via the LIN bus system 1 to the system module 2 is then used as ordinary useful and/or application data, and can for instance be correspondingly processed in the conventional fashion under the control of the program stored in the program memory device 7 by the CPU 8, and/or stored (beforehand and/or afterwards) on the data storage device 6, etc.

Conventional (LIN bus system) modules not supporting the above normal operation/programming operation mode change command ("Change Mode" signal), and/or the programming operation mode start command ("Start Boot Mode" signal) (not however corresponding start ROM 10 and/or no system modules operating in the above fashion and including a normal operation/programming operation mode change and/or programming operation mode start control program) can be (additionally) connected and operated in the conventional fashion with the LIN bus system (but cannot however be brought into a programming operation mode in the above special fashion, and will ignore a corresponding "Change Mode" signal and/or "Start Boot Mode" signal transferred on the LIN bus system 1).

Below—in relation to FIGS. 2a and 2b—the alternative possibility already mentioned briefly above, of generating data and/or data signals able to be used as a normal operation/programming operation mode change command, and/or programming operation mode start command, is more closely described.

FIG. 2a shows, as an example, a schematic representation of data transferred according to state of the art technology in terms of the LIN bus protocol—during the normal operating mode—via the LIN bus system 1 shown in FIG. 1.

As is apparent from FIG. 2a—after, at the start of the transfer process between the master and one of the slaves, where applicable, corresponding header data contained in corresponding header data blocks not shown here has been transferred (not shown here)—the data blocks 21, 22 including actual useful and/or application data to be transferred from the master to the appropriate slave via the transmission line 1a of the LIN bus system 1 (or conversely (for instance between various slaves)) can be transferred (for instance in succession one byte of useful data blocks 21, 22 containing useful data etc., for instance from the system module 5 to the system module 2).

The useful and/or application data included in the useful data blocks 21, 22 can for instance be correspondingly processed in the conventional fashion by the CPU 8, under the control of the program stored in the program memory device 7, and/or stored (beforehand and/or afterwards) in the data storage device 6, etc.

In terms of LIN bus protocol, at the end of a transfer executed between for instance the master, and the respective slave (and/or at the end of part of a corresponding transfer section) one or more check sums can be dispatched, for instance in a check sum block 23 (which can for instance contain one byte of check sums) which includes the check sums to be transferred from the master to the respective slave (or vice versa).

The check sums can for instance be calculated by the master and/or slave sending them in each case from the sum of the digits and/or the weight (that is the respective number of ones) of the useful and/or header data blocks being transferred. For instance—in the case where a useful data block 21, 22 includes an uneven number of ones—a zero can be used as check sum, and—in the case where a useful data block contains an even number of ones—a one as check sum (in other words, so-called parity bits can for instance be used as checksums).

In FIG. 2b, as an example, a schematic representation of data able to be transferred via the LIN bus system shown in FIG. 1 in the alternative embodiment example of the invention, as normal operation/programming operation mode change command and/or programming operation mode start command is shown.

As is apparent from FIG. 2b—after, at the start of a transfer executed between the master (for instance the system module 5), and one of the slaves (for instance the system module 2) where applicable, corresponding header data contained in corresponding header data blocks, not shown here, has been transferred (not shown here)—correspondingly similar to the conventional fashion for instance in which corresponding useful and/or application data, and/or advantageously corresponding data blocks 21', 22' including programming data—corresponding with the useful data blocks 21, 22 shown in FIG. 2a—is transferred via the transmission line 1a of the LIN bus system 1 from the master to the respective slave (or vice versa) (and/or so is corresponding "pseudo" useful data blocks 21', 22' together with "pseudo" useful and/or "pseudo" application data not intended to be used as useful and/or application data, but used as the (first) part of a "normal operation/programming operation mode change command" and/or a "programming operation mode start command", and/or in particular as "programming data").

As already described in relation to FIG. 2a, at the end of a transfer executed between the master and the respective slave (and/or at the end of a corresponding section of a transfer) one or more check sums can be transferred in terms of LIN bus protocol, for instance in a check sum block 23' (which can for instance include one byte of checksums) including the check sums to be transferred from the master to the respective slave (or vice versa).

In order to transfer a "normal operation/programming operation mode change command" and/or "programming operation mode start command" in terms of the above alternative embodiment example—as illustrated in FIG. 2b—for instance no check sums correspondingly calculated and/or generated as described above are transferred, but rather check sums calculated and/or generated in a pre-determined, different fashion (i.e.—in total—a check sum block 23' calculated and/or generated in a pre-determined, different fashion and/or deliberately modified).

For instance (as a further part of a "normal operation/ programming operation mode change command" and/or "programming operation mode start command")—instead of a check sum block 23 calculated and/or generated in the fashion described above, a check sum block 23', inverted in relation to it, can be used.

In order to calculate the check sums included in the—inverted—check sum block 23, first for instance, as correspondingly described above, the sum of digits and/or the weight of the (pseudo) useful and/or programming and/or (pseudo) header data blocks can be generated (and/or corresponding parity bits can be calculated) for instance by the respective transferring master and/or slave; next—in contrast to what has been described above—the bits determined in each case are inverted and subsequently used as check sums to be transferred.

For instance—in the case where a (pseudo) useful and/or programming and/or (pseudo) header data block 21', 22' includes an uneven number of ones—a one can be used as a check sum instead of a zero, and—in the case where a (pseudo) useful and/or programming and/or (pseudo) header data block 21', 22' includes an even number of ones—a zero can be used as check sum instead of a one (in other words correspondingly inverted parity bits can be used as check sums, for instance so that—as illustrated in FIGS. 2a and 2b—instead of a check sum block 23 with for instance the bits "11010010", a check sum block 23' inverted in relation to it with for instance the bits "00101101" is transferred via the transmission line 1a of the LIN bus system 1 from the master to the slave (or vice versa)).

Alternatively or additionally, in order to determine the binary number included in a deliberately modified check sum block 23', a pre-determined offset value (for instance "000011111", etc.) can be added to the binary number (for instance to the binary number representing a particular check sum) contained in the conventionally generated check sum block (so that instead of a check sum block 23 with for instance the bits "11010010"—for instance containing a corresponding check sum—a check sum block 23' with for instance the bits "1100001" is transferred via the transmission line 1a of the LIN bus system 1 from the master to the slave (or vice versa).

Advantageously, a deliberately modified check sum block 23' should guarantee the same or equal test coverage and/or test quality as a check sum block 23 constructed in the conventional fashion.

In addition, check sum blocks 23, 23' constructed in the conventional fashion, and corresponding assigned deliberately modified check sum blocks 23, 23', should in each case contain binary numbers spaced as far apart from one another as is possible (in particular exhibiting the largest possible hamming distance).

REFERENCE NUMBERS

1 LIN bus system
1a Transfer line
2 System module
2a LIN bus input
3 System module
3a LIN bus input
4 System module
4a LIN bus input
5 System module
5a LIN bus input
6 Data storage device
7 Program storage device
8 CPU
9 Micro-controller system
10 Start ROM 21 Useful data block
21' Programm data block
22 Useful data block
22' Programm data block
23 Check sum block
23' Inverted check sum block
101 Timer device
102a Voltage supply input
202a Voltage supply input

What is claimed is:

1. A process for operating a system module, configured for connection with a LIN bus system, comprising:
   operating the system module in a first operating mode;
   operating the system module in a second operating mode, when, within a predetermined time period after a start of the first operating mode, a mode signal, not defined in a protocol of the bus system, is received via the bus system, wherein data received by the system module in the second operating mode is used as programming data for managing a module software program; and
   operating the system module in a third operating mode, when, within the predetermined time period after the start of the first operating mode, no mode signal is received via the bus system.

2. The process according to claim 1, wherein the third operating mode is a normal operating mode.

3. The process according to claim 1, wherein the second operating mode is a programming mode.

4. The process according to claim 1, wherein the first operating mode is a preprogramming operating mode.

5. The process according to claim 1, wherein data received by the system module in the third operating mode is used as normal application data.

6. The process according to claim 1, wherein the mode signal, not defined in the protocol of the bus system, comprises check bits, which have been created in a fashion that differs from that of the bus system protocol.

7. The process according to claim 6, wherein the mode signal, not defined in the protocol of the bus system, comprises check bits, which have been created in a fashion inverted in relation to that of the bus system protocol.

8. The process according to claim 1, wherein the mode signal, not defined in the protocol of the bus system, comprises a signal level not provided for in terms of the bus system protocol.

9. The process according to claim 1, wherein the mode signal, not defined in the protocol of the bus system, comprises an impulse duration not provided for in terms of the bus system protocol.

10. The process according to claim 1, wherein the managing comprises one or more of:
    loading;
    modifying; or
    deleting.

11. The process according to claim 1, wherein the mode signal comprises one or more of:
    a mode start signal; or
    mode change signal.

12. An electronic module, configured for connection with a LIN bus system, and which comprises:
    a device for detecting whether, within a pre-determined time period after a start of a first module operating mode, a mode signal is received via the bus system;
    wherein the device comprises a ROM;
    wherein the device is constructed and arranged such that when, within the pre-determined time period after the start of the first module operating mode:
       a mode signal is received via the bus system, a change into a second module operating mode is caused; or
       no mode signal is received via the bus system, a change into a third module operating mode is caused.

13. Then electronic module according to claim 12, in which the ROM is a start ROM.

14. The electronic module according to claim 12, in which a control program is stored on the ROM to detect whether, within the pre-determined time period after the start of the first module operating mode, a mode signal is received via the bus system.

15. The electronic module according to claim 12, wherein the mode signal comprises one or more of:
    a mode start signal; or
    mode change signal.

16. A process for operating a system module, configured for connection with a LIN bus system, comprising:
    operating the system module in a first operating mode;
    operating the system module in a second operating mode, when, within a predetermined time period after a start of the first operating mode, a mode signal, not defined in a protocol of the bus system, is received via the bus system; and
    operating the system module in a third operating mode, when, within the predetermined time period after the start of the first operating mode, no mode signal is received via the bus system, wherein data received by the system module in the third operating mode is used as normal application data.

* * * * *